(12) United States Patent
Gaur et al.

(10) Patent No.: US 12,353,839 B2
(45) Date of Patent: Jul. 8, 2025

(54) ON-DEVICE STREAMING INVERSE TEXT NORMALIZATION (ITN)

(71) Applicant: Microsoft Technology Licensing, LLC, Redmond, WA (US)

(72) Inventors: Yashesh Gaur, Redmond, WA (US); Nicholas Kibre, Redwood City, CA (US); Issac J. Alphonso, San Jose, CA (US); Jian Xue, Bellevue, WA (US); Jinyu Li, Sammamish, WA (US); Piyush Behre, Santa Clara, CA (US); Shuangyu Chang, Davis, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 17/693,267

(22) Filed: Mar. 11, 2022

(65) Prior Publication Data
US 2023/0289536 A1    Sep. 14, 2023

(51) Int. Cl.
G06F 40/00    (2020.01)
G06F 40/284    (2020.01)
G06F 40/56    (2020.01)
G10L 15/08    (2006.01)

(52) U.S. Cl.
CPC ............ *G06F 40/56* (2020.01); *G06F 40/284* (2020.01); *G10L 15/08* (2013.01)

(58) Field of Classification Search
CPC ...... G06F 40/56; G06F 40/284; G06F 40/151; G10L 15/08; G10L 15/16; G10L 15/28
See application file for complete search history.

(56) References Cited

U.S. PATENT DOCUMENTS

| | | | |
|---|---|---|---|
| 2009/0157385 A1* | 6/2009 | Tian | G06F 40/40 704/9 |
| 2019/0278841 A1* | 9/2019 | Pusateri | G10L 15/26 |
| 2022/0229993 A1* | 7/2022 | Vu | G06F 40/279 |

OTHER PUBLICATIONS

Garg A, Vadisetti GP, Gowda D, Jin S, Jayasimha A, Han Y, Kim J, Park J, Kim K, Kim S, Lee YY. Streaming On-Device End-to-End ASR System for Privacy-Sensitive Voice-Typing. In Interspeech 2020 (pp. 3371-3375). (Year: 2020).*

(Continued)

*Primary Examiner* — Andrew C Flanders
*Assistant Examiner* — Parker Mayfield
(74) *Attorney, Agent, or Firm* — Foley IP Law, PLLC

(57) ABSTRACT

Solutions for on-device streaming inverse text normalization (ITN) include: receiving a stream of tokens, each token representing an element of human speech; tagging, by a tagger that can work in a streaming manner (e.g., a neural network), the stream of tokens with one or more tags of a plurality of tags to produce a tagged stream of tokens, each tag of the plurality of tags representing a different normalization category of a plurality of normalization categories; based on at least a first tag representing a first normalization category, converting, by a first language converter of a plurality of category-specific natural language converters (e.g., weighted finite state transducers, WFSTs), at least one token of the tagged stream of tokens, from a first lexical language form, to a first natural language form; and based on at least the first natural language form, outputting a natural language representation of the stream of tokens.

18 Claims, 10 Drawing Sheets

(56) References Cited

OTHER PUBLICATIONS

Zhang Y, Bakhturina E, Gorman K, Ginsburg B. Nemo inverse text normalization: From development to production. arXiv preprint arXiv:2104.05055. Apr. 11, 2021. (Year: 2021).*

Ebden P, Sproat R. The Kestrel TTS text normalization system. Natural Language Engineering. May 2015;21(3):333-53. (Year: 2015).*

Gorman K, Sproat R. Minimally supervised number normalization. Transactions of the Association for Computational Linguistics. Nov. 1, 2016;4:507-19. (Year: 2016).*

Sunkara M, Shivade C, Bodapati S, Kirchhoff K. Neural inverse text normalization. In ICASSP 2021-2021 IEEE International Conference on Acoustics, Speech and Signal Processing (ICASSP) Jun. 6, 2021 (pp. 7573-7577). IEEE. (Year: 2021).*

Lai, et al., "A Unified Transformer-based Framework for Duplex Text Normalization", In repository of arXiv:2108.09889v1, Aug. 23, 2021, 5 Pages.

"International Search Report and Written Opinion Issued in PCT Application No. PCT/US22/054039", Mailed Date: Apr. 4, 2023, 12 Pages.

Pusateri, et al., "A Mostly Data-driven Approach to Inverse Text Normalization", In Proceedings of 18th Annual Conference of the International Speech Communication Association, Aug. 20, 2017, pp. 2784-2788.

Zhang, et al., "NeMo Inverse Text Normalization: From Development To Production", In repository of arXiv:2104.05055v2, May 17, 2021, 5 Pages.

\* cited by examiner

FIG. 3 meet _me _on <address> _ second _avenue _ at <time> _ four <time> _ thirty <time> _ p <time> _ m  ← 150a meet _me _on <address start> _ second _avenue <address stop> _ at <time start> _ four _thirty _p _m <time stop>  ← 150b <null> _ meet <null> _ me <null> _ on <address> _ second <address> _ avenue <null> _ at <time> _ four <time> _ thirty <time> _ p <time> _ m  ← 150c

ON-DEVICE STREAMING INVERSE TEXT NORMALIZATION (ITN)

BACKGROUND

Inverse text normalization (ITN) renders the lexical language output of automatic speech recognition (ASR) output tokens into a more readable natural language form. For example, the lexical language form "This item costs nine ninety nine dollars and ninety nine cents" (as may be output by ASR) is more readily-understandable by humans when presented as "This item costs $99.99" in a written transcript.

Weighted finite state transducers (WFSTs) are rule-based speech converters that are commonly used to perform ITN. However, the computational demands and size of WFSTs render them unsuitable for implementation on mobile devices. As a result, WFSTs are typically more suitable in a cloud service scenario, in which captured audio is sent off the device for remote processing on high-performance hardware, with a transcript returned at a later time. This off-device processing may raise privacy issues, in some scenarios.

Additionally, due to the complexity of generating rules for categorizing lexical language, common WFST implementations suffer from poor accuracy. The common WFST solution also relies on processing the full utterances after end of speech is detected, which precludes use on live speech. This renders WFSTs unsuitable for application to real-time streaming output (e.g., live speech transcription).

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for on-device streaming inverse text normalization (ITN) include: receiving a stream of tokens, each token representing an element of human speech; tagging, by a tagger (e.g., a neural network), the stream of tokens with one or more tags of a plurality of tags to produce a tagged stream of tokens, each tag of the plurality of tags representing a different normalization category (e.g., ITN category) of a plurality of normalization categories; based on at least a first tag representing a first normalization category, converting, by a first language converter of a plurality of category-specific natural language converters (e.g., weighted finite state transducers, WFSTs), at least one token of the tagged stream of tokens, from a first lexical language form, to a first natural language form; and based on at least the first natural language form, outputting a natural language representation of the stream of tokens.

BRIEF DESCRIPTION OF THE DRAWINGS

The disclosed examples are described in detail below with reference to the accompanying drawing figures listed below:

FIG. 3 illustrates exemplary tagging options that may be used in the arrangement of FIG. 1;

Corresponding reference characters indicate corresponding parts throughout the drawings.

DETAILED DESCRIPTION

Figure 1:
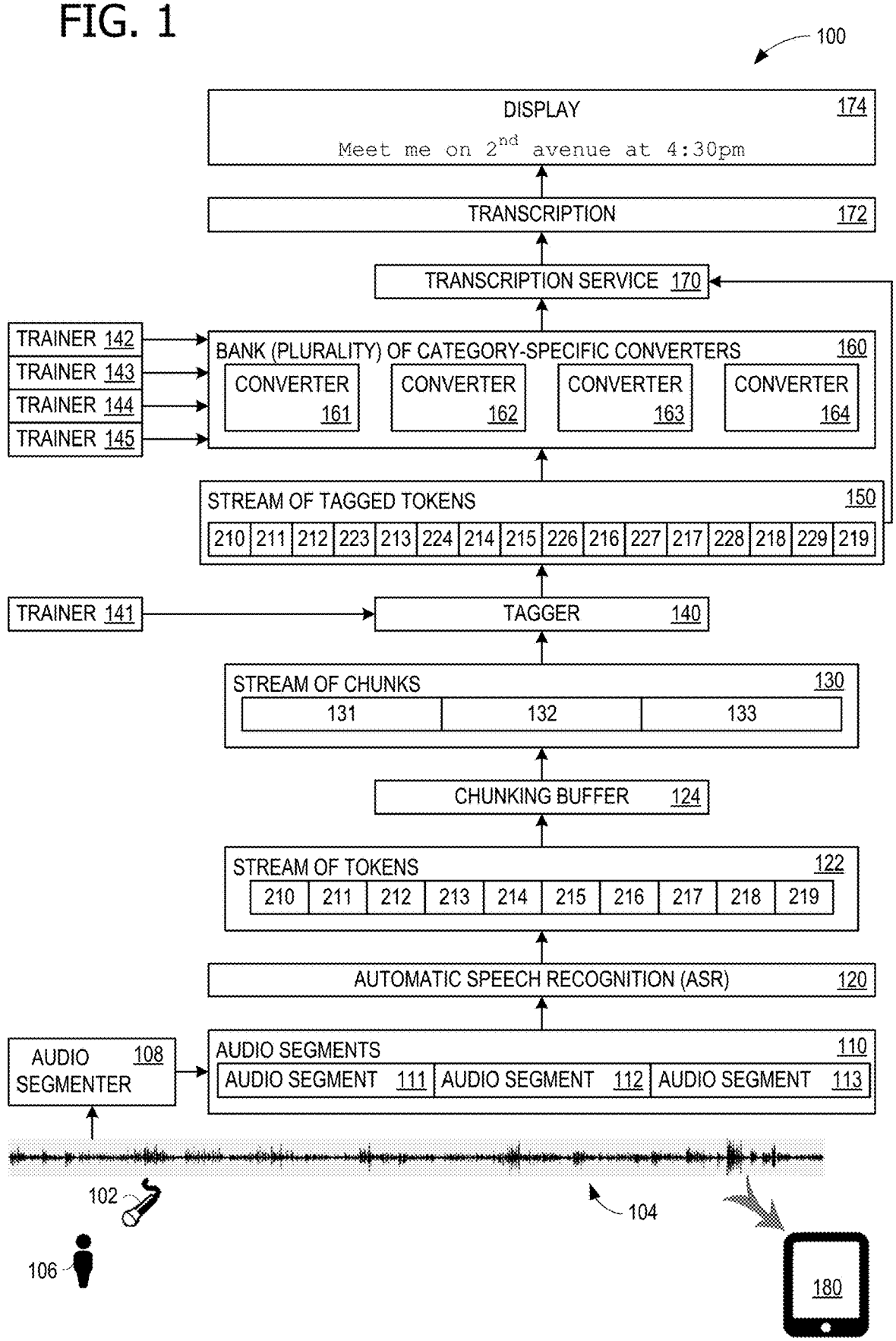
FIG. 1 illustrates an example arrangement that advantageously provides on-device streaming inverse text normalization (ITN)

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Example solutions for on-device streaming inverse text normalization (ITN) include: receiving a stream of tokens, each token representing an element of human speech; tagging, by a tagger that is able to function in a streaming manner (e.g., a neural network processing by chunks), the stream of tokens with one or more tags of a plurality of tags to produce a tagged stream of tokens, each tag of the plurality of tags representing a different normalization category (e.g., ITN category) of a plurality of normalization categories; based on at least a first tag representing a first normalization category, converting, by a first language converter of a plurality of category-specific natural language converters (e.g., weighted finite state transducers, WFSTs), at least one token of the tagged stream of tokens, from a first lexical language form, to a first natural language form; and based on at least the first natural language form, outputting a natural language representation of the stream of tokens.

Streaming is a method of transmitting or receiving data, such as audio, video, or transcription text of live speech, as a steady, continuous flow, allowing playback to start, pause, and rewind, while further data is still being received. A stream of data, such as a stream of tokens (representing audio), is a transfer of data at a rate that is sufficient to support an application that consumes streaming data or converts streaming data from one form to another (e.g., an incoming stream of tokens to streaming transcription text output). The tokens described herein are automatic speech recognition (ASR) tokens, which are a defined set of digital symbols that are each mapped to a recognized spoken word or sub-word.

Text normalization is a process of transforming text into a single canonical form that it might not have had before, such as by replacing certain words with symbols, and possibly re-arranging the order and/or inserting punctuation. This may be used to convert from common oral to common written representations, when they differ. For example, the words "five dollars" are replaced with a number ("5") replacing a word and a currency symbol ("$") replacing a word. The order is then swapped, because "$5" is the common written representation, rather than "5$". As another example, for the words "january one nineteen eighty", "January" is capitalized, one is changed to a number ("1"), a comma is inserted, and the words "nineteen eighty" are replaced with two numbers without a space between ("1980"). The result is that "january one nineteen eighty" becomes "Jan. 1, 1980". A normalization category is a context that has a set of common text normalization rules. In the examples just provided, text normalization for currency has a different set of rules than text normalization for dates, and thus are separate normalization categories.

Further example solutions for on-device streaming ITN include: receiving a stream of tokens, each token representing an element of human speech; tagging, by a tagger, the stream of tokens with a first tag to produce a tagged stream of tokens; based on at least the first tag, converting by a first language converter, at least one token of the tagged stream of tokens, from a first lexical language form to a first natural language form; based on at least the first natural language form, outputting a natural language representation of the stream of tokens.

Aspects of the disclosure improve the operations of computing devices at least by enabling ITN to be performed on user devices and/or operate in a streaming fashion. For example, aspects of the disclosure tag a stream of tokens with a tag that represents one of a plurality of normalization categories, and convert at least one token from a first lexical language form to a first natural language form with a first language converter of a plurality of category-specific natural language converters, based on at least the tag.

This two-stage conversion, using a tagger (e.g., a neural network, NN) that is focused on categorization—not burdened with the entirety of the language conversion task—and using a plurality of category-specific language converters (e.g., WFSTs) that are each focused on a single category of conversion (e.g., address, time, date, and currency), significantly speeds up performance and reduces overall solver size. This is accomplished by permitting the use of different architectures that are relatively optimum for their specific portion of the overall task. For example, NNs perform relatively well on categorization, and if trained only for the categorization task may be relatively compact, fast, and accurate. WFSTs perform relatively well on conversion, when the conversion is limited to a specific category (e.g., a single one of address, time, date, and currency). This multi-stage hybrid solution may be faster, smaller, and more accurate than attempting to solve the entire problem using only a single NN or WFST as the entire solver solution.

FIG. 1 illustrates an example arrangement 100 that advantageously provides on-device streaming ITN, for example on a mobile device 180. A microphone 102 (or microphone array) captures an audio input 104 comprising human speech from a speaker 106. An audio segmenter 108 segments audio input 102 into a plurality of audio segments 110, for example comprising audio segment 111, audio segment 113, audio segment 113, and others. Plurality of audio segments 110 are provided to an ASR component 116.

Figure 2:
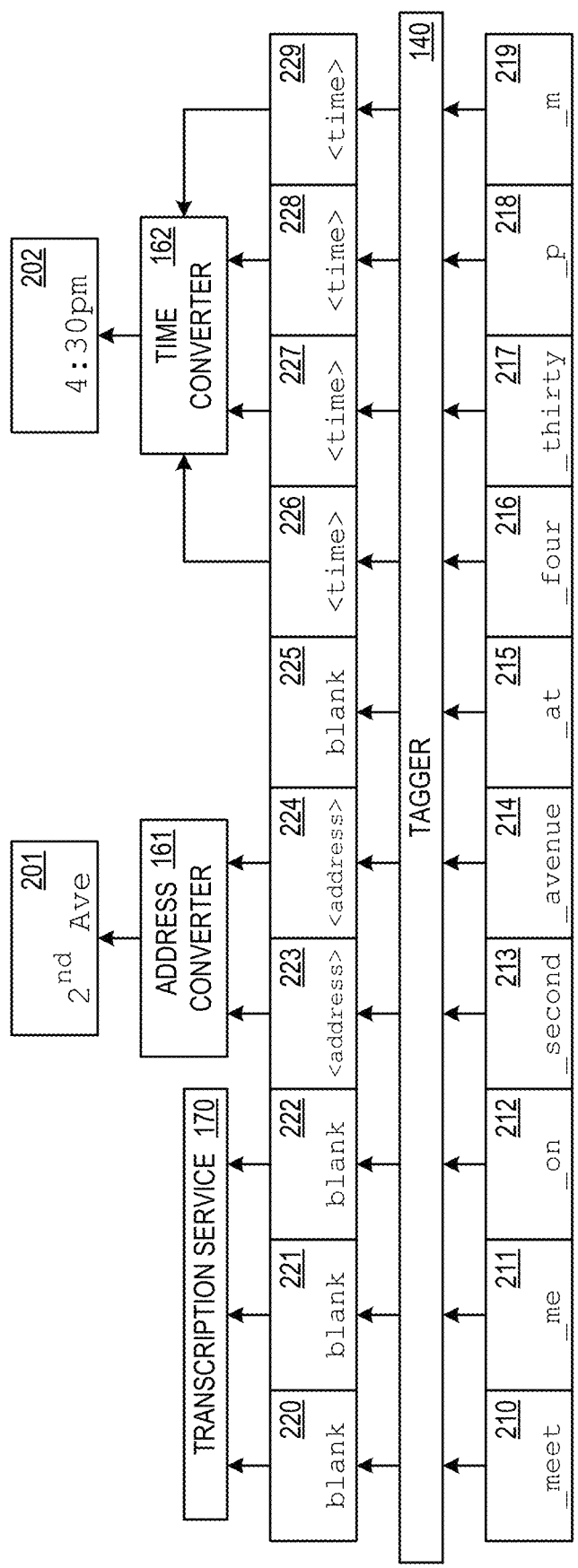
FIG. 2 illustrates further exemplary detail regarding tagging, as may be performed using the arrangement of FIG. 1.

ASR component 120 recognizes elements of human speech in audio segments 111-113 and outputs a stream of tokens 122, for example comprising tokens 210-229. Each of tokens 210-229 represents an element of human speech in a lexical language form, for example a word. Further detail for tokens 210-229 is shown in FIG. 2, using an example sentence. A chunking buffer 124, described in further retail in relation to FIG. 4, chunks stream of tokens 122 into stream of chunks 130. Stream of chunks 130 comprises chunks 131-133, each of which comprises a plurality of tokens, for example three tokens per chunk. (See FIG. 4 for an example.)

A tagger 140, which may comprise an NN, tags stream of tokens 122 (which, in this example are chunked into stream of chunks 130) according to a category of speech (e.g., address, location, time, date, currency, decimal, fraction, email, internet address, or math) to produce a tagged stream of tokens 150. This is shown in further detail in relation to FIG. 4. In some examples, tagger 140 comprises a transformer NN. A transformer NN is configured to solve sequence-to-sequence tasks while handling long-range dependencies (e.g., relatively distant prior inputs), and is thus suitable to classifying long strings of ASR tokens into normalization categories. For example, phone numbers in the USA are ten numerical digits, and so span at least ten spoken words. Transformer NNs typically rely on self-attention to compute representations of input and output without using sequence-aligned recurrent NNs (RNNs) or convolution.

Chunking stream of tokens 122 into sets of tokens, (e.g., three to ten tokens per chunk) permits an NN to process each chunk rapidly in order to permit arrangement 100 to operate in a streaming fashion. As shown, tag 223, tag 224, and tags 226-229 are interspersed among tokens 210-229 within tagged stream of tokens 150. Each of tags 226-229 represents a normalization category (e.g., a category of speech, such as address, time, date etc.).

A trainer 141 trains tagger 140 to perform the tagging task. However, because trainer 141 needs to train tagger 140 on a limited-focus task (e.g., tagging), and not on ITN spanning multiple categories of speech, training of tagger 140 is simplified. Furthermore, tagger 140 may be compressed and thus may be considerably more compact than a NN that attempts to perform ITN on untagged speech tokens.

A bank of category-specific language converters, plurality of category-specific natural language converters 160 receives tagged stream of tokens 150. Plurality of category-specific natural language converters 160 is illustrated as comprising four language converters, language converters 161-164, although it should be understood that a different number of language converters may be used, depending on the number of natural language categories for which a language converter is provided. Example categories, for which a category-specific natural language converter may be provided, include address, location (e.g., city or region without a street), time, date, currency, decimal, fraction, email, internet address, and math (e.g., numbers and operations such as "+").

Each of language converters 161-164 of plurality of category-specific natural language converters 160 monitors tagged stream of tokens 150 for a tag that it recognizes and is trained to operate upon. Each of language converters 161-164 may convert only a single category or a limited number of multiple categories of speech. When the proper token, matching a recognized category of one of language converters 161-164 is encountered, the language converter converts the tagged token(s) from the lexical language form output by ASR component 120 to a natural language form. The natural language form is passed to a transcription service 170 that produces a transcription 172 (outputs a natural language representation of stream of tokens 122) for display on a display device 174. If a token is untagged (or tagged as not needing conversion) the token may bypass plurality of category-specific natural language converters 160 and go straight to transcription service 170.

Each of language converters 161-164 may comprise a WFST. A trainer 142 trains language converter 161, a trainer 143 trains language converter 162, a trainer 143 trains language converter 164, and a trainer 145 trains language converter 164. However, because each of trainers 142-145 needs to train its respective language converter for only a single category or a limited number of categories, training of language converters 161-164 is simplified. Further, each of language converters 161-164 may be considerably more compact than a WFST that attempts to perform ITN on untagged speech tokens.

An example sentence "Meet me on $2^{nd}$ avenue at 4:30 pm" is shown in FIG. 1, in a natural language form that may be more readable than the lexical form of "meet me on second avenue at four thirty p m".

In some examples, other than trainers 141-145, everything shown in arrangement 100 between microphone 104 and display device 174 is implemented on mobile device 180. In some examples, mobile device 180 uses an external microphone 104 and/or an external display device 174, but implements ITN on-device. Thus, the need to send audio input 104 over the internet to a remote cloud service, relying on connectivity and risking privacy issues, is precluded. The total size of the ITN implementation (from audio input through transcription output) may be a fraction of the size of a common cloud implementation, with comparable accuracy, and a latency of less than two tokens.

FIG. 2 illustrates further exemplary detail regarding tagging, as may be performed using arrangement 100. Tokens 210-229 are generated by ASR component 120 by speaker 106 speaking ""meet me on second avenue at four thirty p m". Token 210 represents "meet", token 211 represents "me", token 212 represents "on", token 213 represents "second", token 214 represents "avenue", token 215 represents "at", token 216 represents "four", token 217 represents "thirty", token 218 represents "p", and token 219 represents "m". Of this sentence, "second avenue" is an address, "four thirty p m" is a time, and the remainder ("meet me on" and "at") does not require conversion. Tagger 140 generates blank or null tags 220-222 and 225 for each of the tokens corresponding to a respective one of the words in "meet me on" and "at", and category-specific tags 223, 224, and 226-229 for each of the tokens corresponding to a respective one of the words in "second avenue" and "four thirty p m".

The result is: blank tag 220 for "meet" token 210, blank tag 221 for "me" token 211, blank tag 222 for "on" token 212, address tag 223 for "second" token 213, address tag 223 for "avenue" token 214, blank tag 225 for "on" token 215, time tag 226 for "four" token 216, time tag 227 for "thirty" token 217, time tag 228 for "p" token 218, and time tag 229 for "m" token 219. In this example, a first tag (tag 223) represents a first normalization category (address) of a plurality of normalization categories, and a second tag (tag 226) represents a second normalization category (time) of the plurality of normalization categories.

The resulting set of tags and tokens (tagged stream of tokens 150) is shown in various forms in FIG. 3, as one of tagged stream of tokens 150*a*, tagged stream of tokens 150*b*, or tagged stream of tokens 150*c*.

Turning briefly to FIG. 3, FIG. 3 illustrates various exemplary tagging options are illustrated. Tagged stream of tokens 150*a* shows only non-blank tags interspersed with tags. Tagged stream of tokens 150*b* shows a start tag and a stop tag surrounding all tokens forming an unbroken string of commonly-tagged tokens. For example, a start address token precedes "second avenue" and a stop address token follows, and a start time token precedes "four thirty p m" and a stop time token follows.

Tagged stream of tokens 150*c* shows even blank or null tags preceding tokens that do not need conversion. With this tagging option, all tokens are tagged.

Returning to FIG. 2, tokens not needing conversion bypass language converters and go to transcription service 170. In some examples, the blank or null tokens are instead replaces with a "<pass>" or other token which clearly signals to transcription service 170 and language converter 161-164 that the tokens tagged thusly are not to be converted. Tokens 223 and 224 are picked up by language converter 161, illustrated in FIG. 2 as an address converter, which outputs "$2^{nd}$ avenue" as a natural language form 201. Tokens 226-229 are picked up by language converter 162, illustrated in FIG. 2 as a time converter, which outputs "4:30 pm" as a natural language form 202. These natural language forms 201 and 202 are also sent to transcription service 170 for outputting (e.g., as part of transcript 172).

Figure 4:
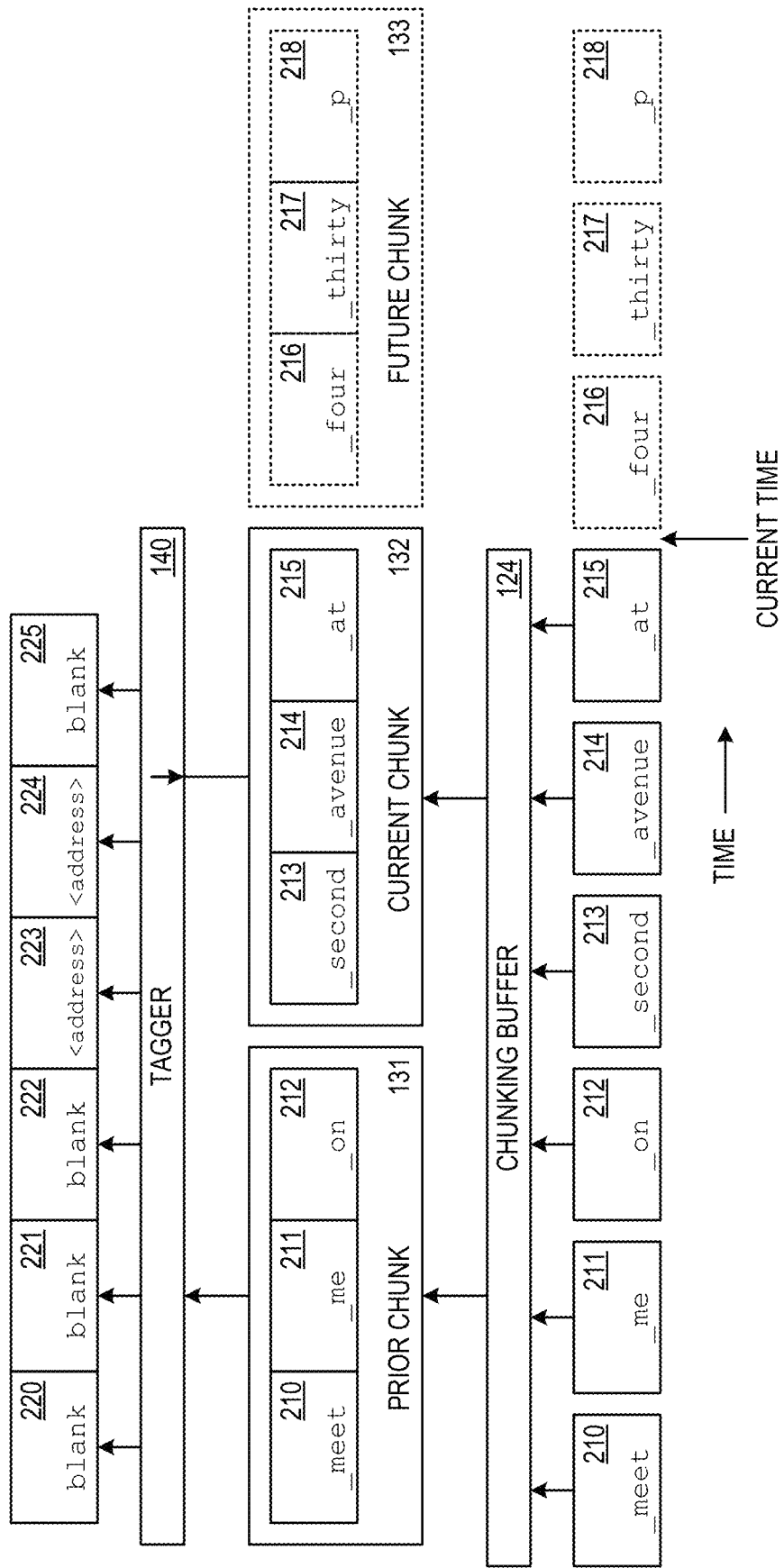
FIG. 4 illustrates further exemplary detail regarding chunking, as may be performed using the arrangement of FIG. 1.

FIG. 4 illustrates further exemplary detail regarding chunking, as may be performed using arrangement 100. Chunking buffer 122 intakes tokens, buffers a select number, then outputs a chunk of those tokens, and then begins buffering another set of tokens. FIG. 4 indicates the time sequence of the tokens, and shows the current time as between tokens 215 and 216 for the words "at" and "four". In this representation, speaker 106 has already uttered, and ASR component 120 has already output tokens for, "meet me on second avenue at", but tokens for "four thirty p m" are not yet available. In this example, chunking buffer 124 is set at 3 tokens, although chunking buffer 124 may use a different number of tokens, and may even use dynamic chunking that increases and decreases the number of token per chunk.

The current chunk of tokens is chunk 132, comprising tags 213-215 for "second avenue at". Current chunk 132 is sent to tagger 140 so that tagger 140 is able to operate on the tokens in a context of multiple tokens. Tagger 140 intakes at least the current chunk of tokens. However, in order to increase accuracy, tagger 140 also operates on at least one prior chunk, which at the current time depicted, is chunk 131. Such a scheme of using both current and one or more prior chunks increases accuracy, when a context spans several tokens (e.g., a typical phone number in the USA spans ten numbers). Tagger 140 outputs tags 223-226 for tokens 213-215 in chunk 132 without waiting for token 216 and/or later tokens. This permits arrangement 100 to operate in a streaming manner, although with a minimum latency that depends on at least the current chunk size. There is a balance between accuracy and latency, which is at least partially driven by chunk size. Chunk size impacts latency, with smaller chunks providing lower latency at the expense of lower accuracy and larger chunks providing higher accuracy at the expense of higher latency. In scenarios in which accuracy is more important than latency, chunk size may be increased.

Figure 5:
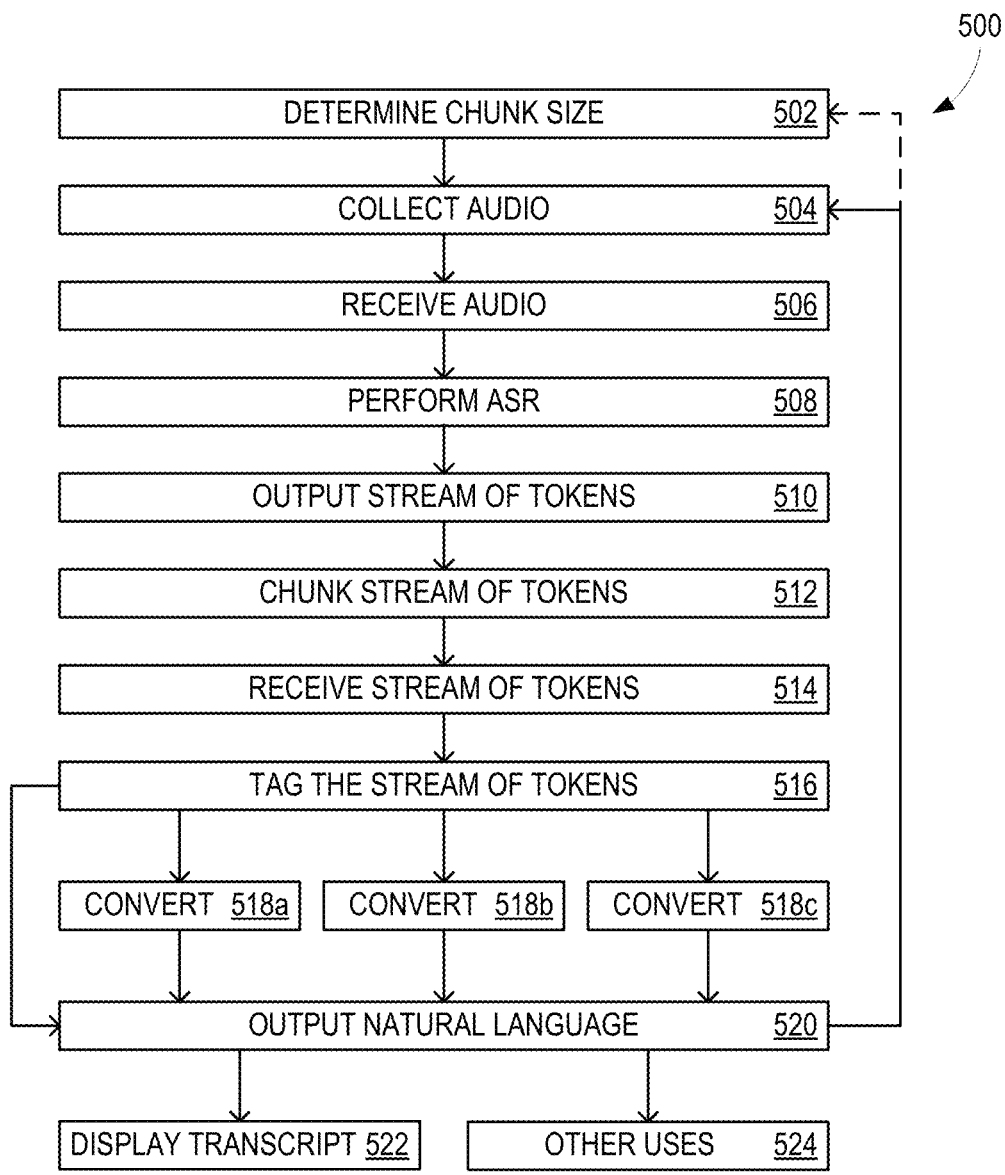
FIG. 5 shows a flowchart illustrating exemplary operations that may be performed using the arrangement of FIG. 1.

FIG. 5 shows a flowchart 500 illustrating exemplary operations that may be performed using arrangement 100. In some examples, operations described for flowchart 500 are performed by computing apparatus 1000 of FIG. 10. Flowchart 500 commences with operation 502, which determines the current chunk size. Operation 502 may occur a single time, in response to a user instruction, or periodically (e.g., dynamic chunking is used).

Microphone 102 captures audio input 104 comprising human speech in operation 504. ASR component 120 receives audio input 104 (e.g., as plurality of audio segments 110) in operation 506, performs an ASR process on audio input 104 in operation 508, and outputs stream of tokens 122 in operation 510. Each token represents an element of human speech, such as a word or other element.

Chunking buffer 124 chunks stream of tokens 122 in operation 512, and operation 514 includes receiving stream of tokens 122 (e.g., in chunks) by tagger 140. Tagger 140 tags stream of tokens 122 with one or more tags of a plurality of tags to produce tagged stream of tokens 150. Each tag of the plurality of tags represents a different normalization category of a plurality of normalization categories. As indicated, tagger 150 tags stream of tokens 122 by chunks, so in operation 514, tagger 140 receives the current chunk of tokens, and in some examples, further intakes at least one prior chunk of tokens. In operation 516, the stream of tokens are tagged. The tagging has possible variations, such as tagging each token individually, or inserting a start tag and a stop tag into stream of tokens 122 such that a pair of start and stop tags is used to tag all of the tokens therebetween. Tagging stream of tokens 122 is performed locally, for example within mobile device 180. In some examples, tagger 140 comprises any of an NN, a compressed NN, and/or a transformer NN.

Operations 518a, 518b, and 518c occur in parallel, one for each category-specific language converter. Operation 518a includes, based on at least a first tag (e.g., tag 223) representing a first normalization category (e.g., address), converting, by a first language converter (e.g., language converter 161) of plurality of category-specific natural language converters 130, at least one token (e.g., token 213) of tagged stream of tokens 150, from a first lexical language form, to a first natural language form. Operation 518b includes, based on at least a second tag (e.g., tag 226) representing a second normalization category (e.g., time) different from the first normalization category, converting, by a second language converter (e.g., language converter 161), at least one token of tagged stream of tokens 150, from a second lexical language form, to a second natural language form. Operation 518c is similar, but with a different tag category and a different language converter.

In some examples, each language converter of plurality of category-specific natural language converters 160 comprises a WFST. In some examples, plurality of category-specific natural language converters 160 comprises at least two natural language converters selected from the category list consisting of: address, location, time, date, currency, decimal, fraction, email, internet address, and math. In some examples, converting a token from a lexical language form to a natural language form is performed locally.

Operation 520 includes, outputting a natural language representation of stream of tokens 122, based on at least the first natural language form and/or the second natural language form. In some examples, outputting a natural language representation comprises outputting the natural language representation as a streaming output. In some examples, operation 520 outputs the natural language representation as a textual transcript (e.g., transcript 172). As part of its streaming operation, flowchart 500 returns to operation 504 or, if dynamic chunk sizing is used, to operation 502.

As flowchart 500 is continuing to operating incoming audio input 104, in parallel, operation 522 displays the natural language representation on display device 174 (e.g., outputs transcript 172 on display device 174). In some examples, microphone 104, that captures audio input 102, ASR component 120, tagger 140, plurality of category-specific natural language converters 160, and display device 174 are all disposed on a common mobile device (e.g., mobile device 180). In some examples, ASR component 120, tagger 140, and plurality of category-specific natural language converters 160 are all disposed on a common mobile device. In some examples, tagging stream of tokens 122 and converting the at least one token from the first lexical language form to the first natural language form are performed locally (e.g., without transmitting data to a remote node or using a remote node or an internet connection). In operation 524, the natural language representation is used for other purposes than being displayed.

Figure 6:
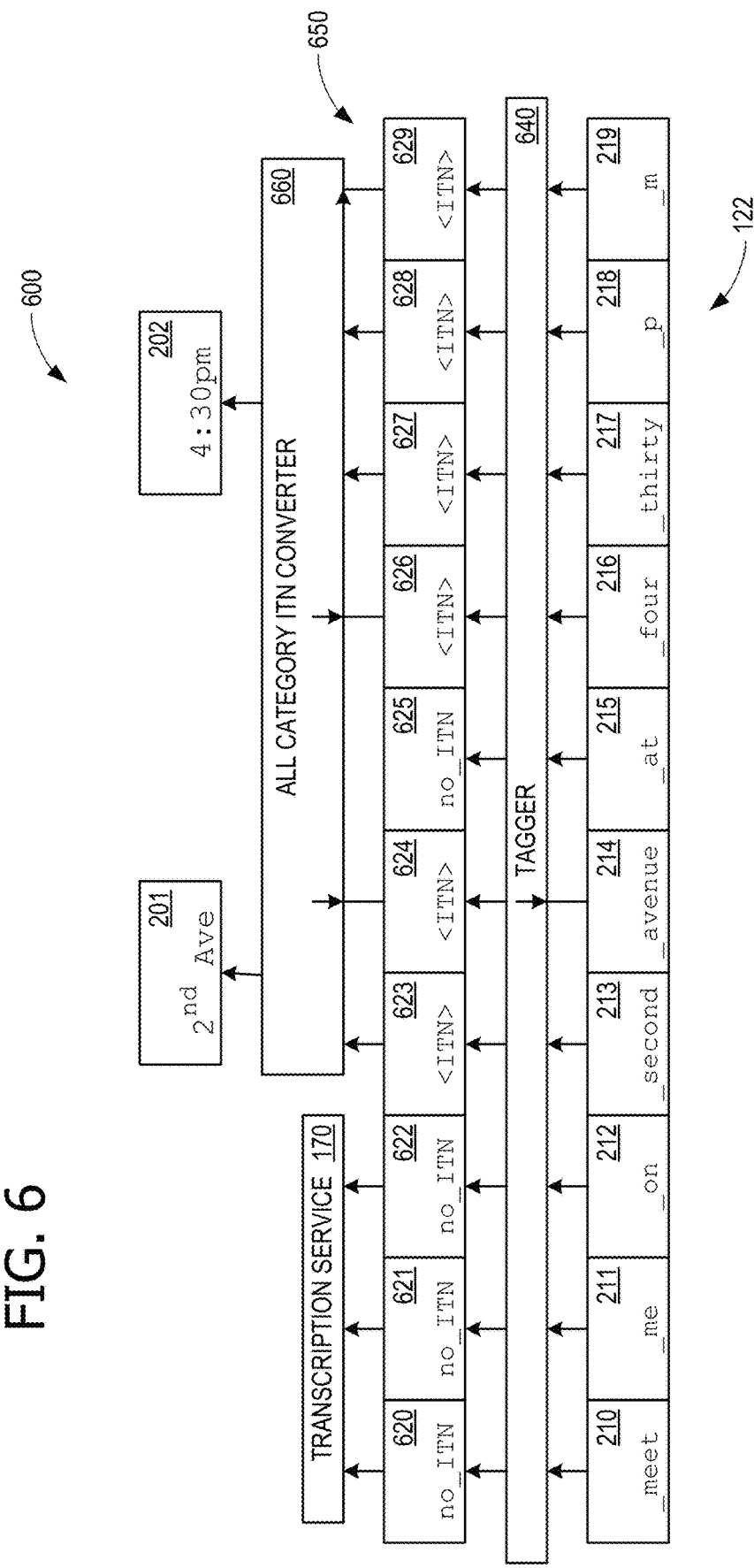
FIG. 6 illustrates alternative exemplary detail regarding tagging, as may be performed using the arrangement of FIG. 1.

FIG. 6 illustrates alternative exemplary detail regarding tagging, as may be performed using arrangement 100. A tagging arrangement 600 is used for languages for which insufficient training data exists for training a tagger to tag multiple categories of speech, and/or training separate category-specific language converters. For this alterative tagging arrangement 600, a tagger 640 replaces tagger 140, a tagged stream of tokens 650 replaces tagged stream of tokens 150, and an (all-category) ITN converter 660 replaces plurality of category-specific natural language converters 160 in FIG. 1.

Tagger 640 does not tag with a speech category (ITN category) but rather with a tag that indicates whether language conversion is required. As indicated, the result is: no_ITN tag 620 for "meet" token 210, no_ITN tag 621 for "me" token 211, no_ITN tag 622 for "on" token 212, ITN tag 623 for "second" token 213, ITN tag 623 for "avenue" token 214, no_ITN tag 625 for "on" token 215, ITN tag 626 for "four" token 216, ITN tag 627 for "thirty" token 217, ITN tag 628 for "p" token 218, and ITN tag 629 for "m" token 219. In FIG. 2, no_ITN indicates that conversion is not need, and ITN indicates that conversion is needed. The task of determining which category is needed for conversion is performed by ITN converter 660, which looks for the ITN tags and also performs the conversion.

Other aspects of arrangement 100 remain similar, for example chunk-by-chunk processing, and streaming on-device operation. Although ITN converter 660 may be more complex than each of category-specific language converters 161-164, the hybrid approach of separating tagging and conversion tasks and using different solution architectures still produces advantages over single-architecture solutions (e.g., using only an NN or a WFST alone).

Figure 7:
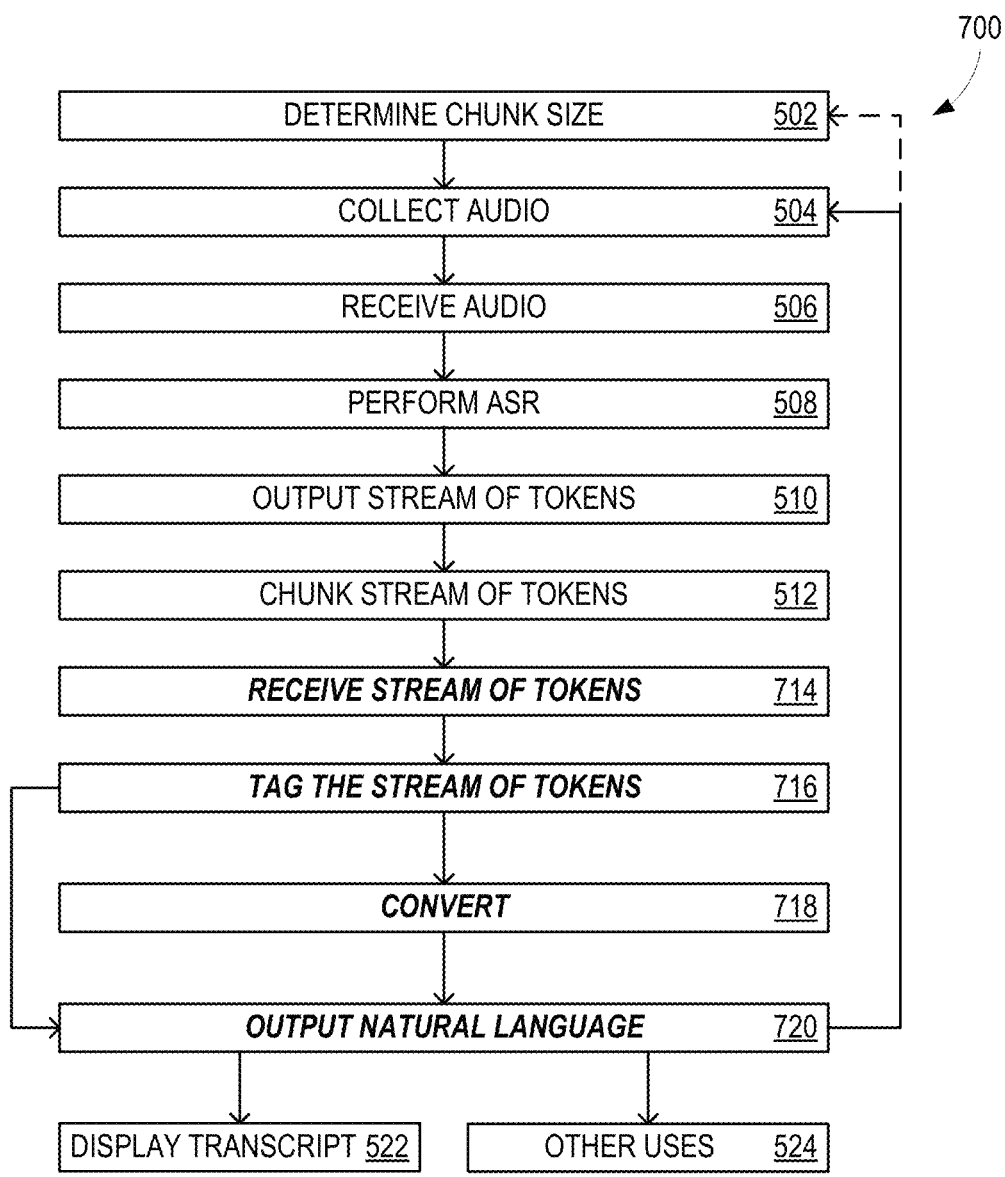
FIG. 7 shows another flowchart illustrating exemplary operations that may be performed using the arrangement of FIG. 1.

FIG. 7 shows a flowchart 700 illustrating exemplary operations that may performed using arrangement 100 that use the alternative tagging scheme shown in FIG. 6. In some examples, operations described for flowchart 700 are performed by computing apparatus 1000 of FIG. 10. Flowchart 700 is similar to flowchart 500, with differences as noted for operations 714-720, which replace a corresponding one of operations 514-520. Operation 714 includes receiving stream of tokens 122 by tagger 640.

Operation 716 includes tagging, by tagger 640, stream of tokens 122 with a first tag (e.g., ITN tag 223) to produce tagged stream of token 650. The first tag indicates whether ITN is to be performed on the at least one token of tagged stream of tokens 650. In flowchart 700, it is the language converter that determines which normalization category of a plurality of normalization categories to use for converting the a lexical language form to a natural language form. This occurs as part of operation 718, which also includes, based on at least the first tag, converting by a language converter, at least one token of tagged stream of tokens 650, from a first lexical language form to a first natural language form. Operation 720 outputs the natural language representation of stream of tokens 122, based on at least the natural language form.

Figure 8:
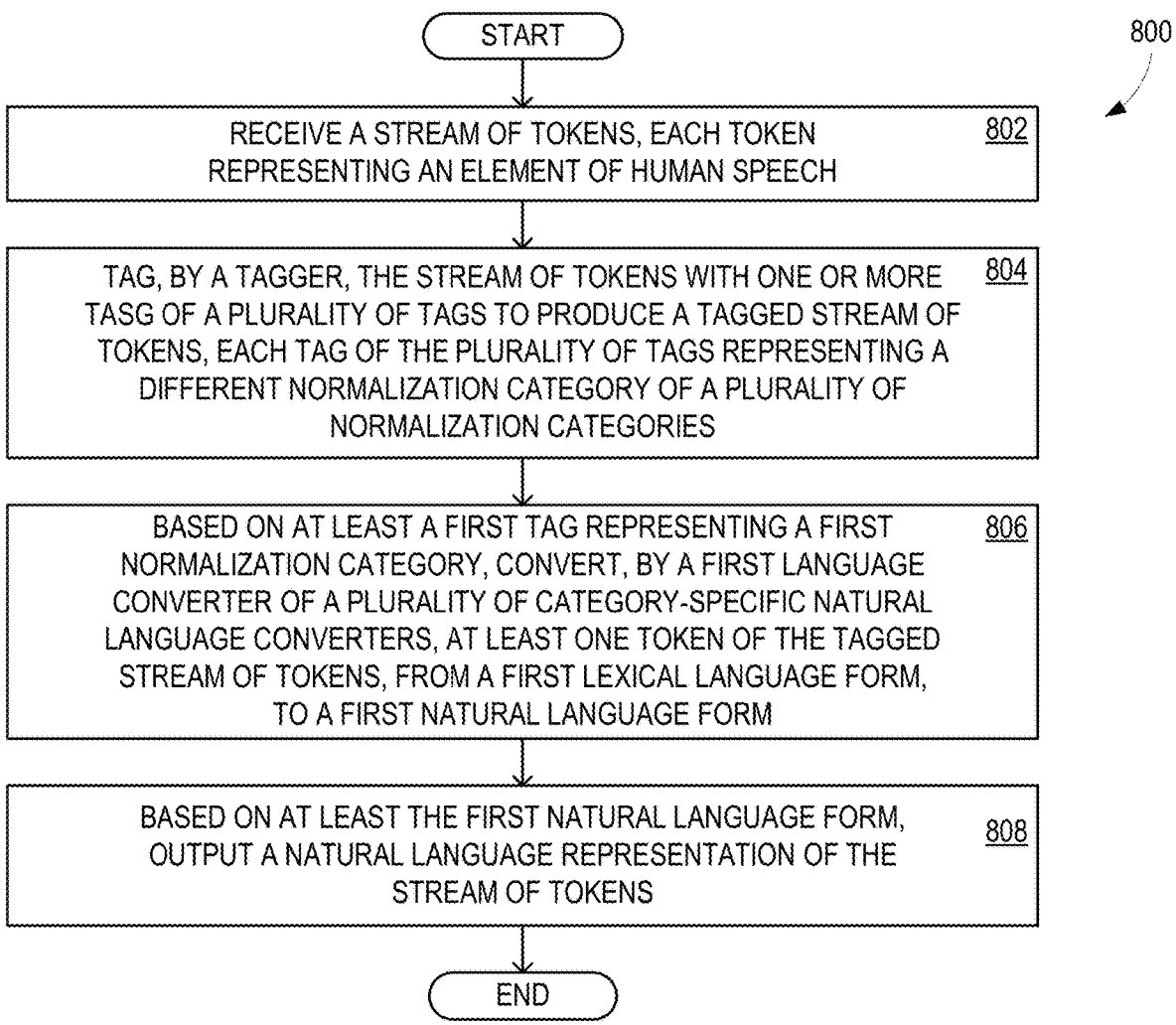
FIG. 8 shows another flowchart illustrating exemplary operations that may be performed using the arrangement of FIG. 1.

FIG. 8 shows a flowchart 800 illustrating exemplary operations associated with arrangement 100. In some examples, operations described for flowchart 800 are performed by computing apparatus 1000 of FIG. 10. Flowchart 800 commences with operation 802, which includes receiving a stream of tokens, each token representing an element of human speech. Operation 804 includes tagging, by a tagger, the stream of tokens with one or more tags of a plurality of tags to produce a tagged stream of tokens, each tag of the plurality of tags representing a different normalization category of a plurality of normalization categories.

Operation 806 includes, based on at least a first tag representing a first normalization category, converting, by a first language converter of a plurality of category-specific natural language converters, at least one token of the tagged stream of tokens, from a first lexical language form, to a first natural language form. Operation 808 includes, based on at least the first natural language form, outputting a natural language representation of the stream of tokens.

Figure 9:
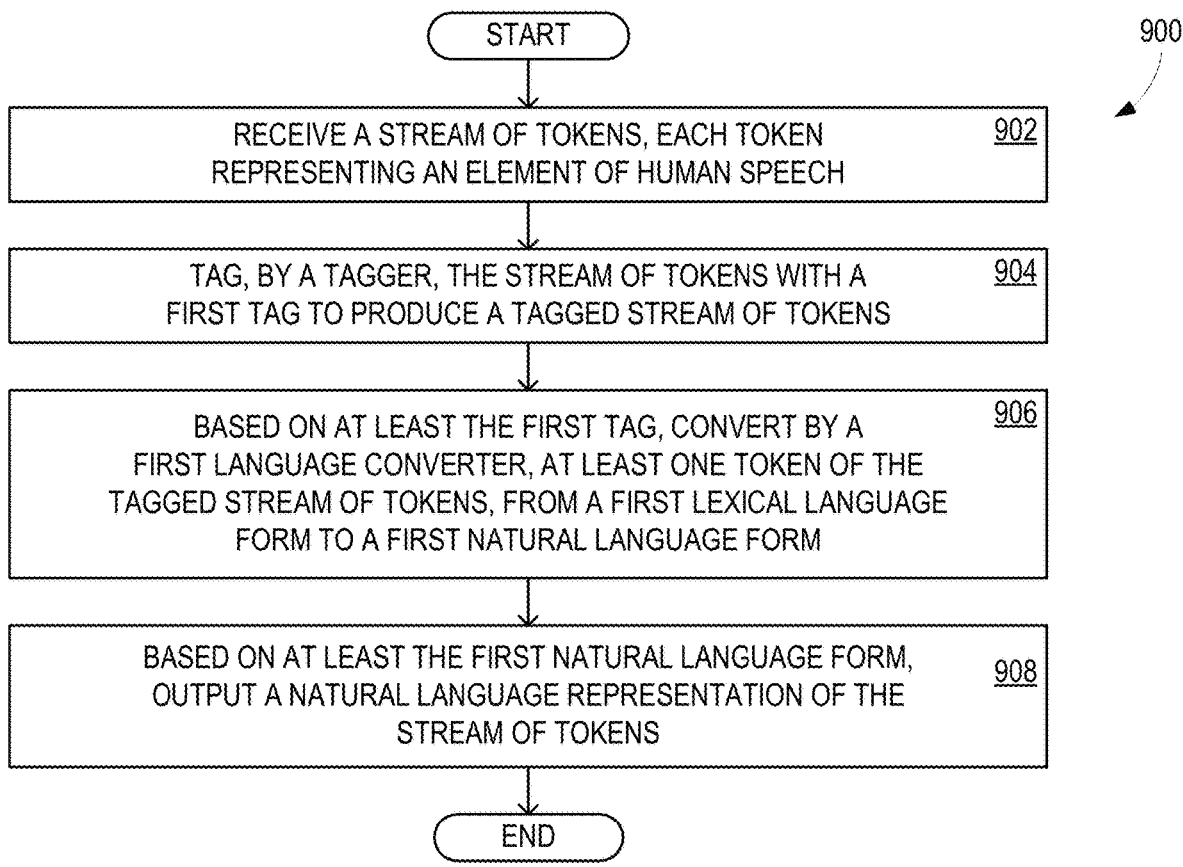
FIG. 9 shows another flowchart illustrating exemplary operations that may be performed using the arrangement of FIG. 1.

FIG. 9 is a flowchart 900 illustrating exemplary operations associated with arrangement 100. In some examples, operations described for flowchart 900 are performed by computing apparatus 1000 of FIG. 10. Flowchart 900 commences with operation 902, which includes receiving a stream of tokens, each token representing an element of human speech. Operation 904 includes tagging, by a tagger, the stream of tokens with a first tag to produce a tagged stream of tokens. Operation 906 includes, based on at least the first tag, converting by a first language converter, at least one token of the tagged stream of tokens, from a first lexical language form to a first natural language form. Operation 908 includes, based on at least the first natural language form, outputting a natural language representation of the stream of tokens.

ADDITIONAL EXAMPLES

An example system comprises: a processor; and a computer-readable medium storing instructions that are operative upon execution by the processor to: receive a stream of tokens, each token representing an element of human speech; tag, by a tagger, the stream of tokens with one or more tags of a plurality of tags to produce a tagged stream of tokens, each tag of the plurality of tags representing a different normalization category of a plurality of normalization categories; based on at least a first tag representing a first normalization category, convert, by a first language converter of a plurality of category-specific natural language converters, at least one token of the tagged stream of tokens, from a first lexical language form, to a first natural language form; and based on at least the first natural language form, output a natural language representation of the stream of tokens.

An example method comprises: receiving a stream of tokens, each token representing an element of human speech; tagging, by a tagger, the stream of tokens with one or more tags of a plurality of tags to produce a tagged stream of tokens, each tag of the plurality of tags representing a different normalization category of a plurality of normalization categories; based on at least a first tag representing a first normalization category, converting, by a first language converter of a plurality of category-specific natural language converters, at least one token of the tagged stream of tokens, from a first lexical language form, to a first natural language form; and based on at least the first natural language form, outputting a natural language representation of the stream of tokens.

One or more example computer storage devices has computer-executable instructions stored thereon, which, on execution by a computer, cause the computer to perform operations comprising: receiving a stream of tokens, each token representing an element of human speech; tagging, by a tagger, the stream of tokens with one or more tags of a plurality of tags to produce a tagged stream of tokens, each tag of the plurality of tags representing a different normalization category of a plurality of normalization categories; based on at least a first tag representing a first normalization category, converting, by a first language converter of a plurality of category-specific natural language converters, at least one token of the tagged stream of tokens, from a first lexical language form, to a first natural language form; and based on at least the first natural language form, outputting a natural language representation of the stream of tokens.

Another example method comprises: receiving a stream of tokens, each token representing an element of human speech; tagging, by a tagger, the stream of tokens with a first tag to produce a tagged stream of tokens; based on at least the first tag, converting by a first language converter, at least one token of the tagged stream of tokens, from a first lexical language form to a first natural language form; based on at least the first natural language form, outputting a natural language representation of the stream of tokens. This additional example method may further be implemented on a system with a processor and a computer-readable medium, and/or on one or more computer storage devices.

Alternatively, or in addition to the other examples described herein, examples include any combination of the following:
  chunking the stream of tokens;
  tagging the stream of tokens comprises tagging the stream of tokens by chunks;
  outputting a natural language representation comprises outputting the natural language representation as a streaming output;
  each language converter of the plurality of category-specific natural language converters comprises a WFST;
  the plurality of category-specific natural language converters comprises at least two natural language converters selected from the category list consisting of: address, location, time, date, currency, decimal, fraction, email, internet address, and math;
  the tagger comprises an NN;
  the tagger comprises a transformer NN;
  the tagger comprises a compressed NN;
  based on at least a second tag representing a second normalization category different from the first normalization category, converting, by a second language converter, at least one token of the tagged stream of tokens, from a second lexical language form, to a second natural language form;
  outputting a natural language representation of the stream of tokens comprises: based on at least the first natural language form and the second natural language form, outputting the natural language representation of the stream of tokens;

capturing an audio input comprising human speech;
receiving, by an ASR component, the audio input;
performing an ASR process on the audio input;
outputting, by the ASR component, the stream of tokens;
each token of the stream of tokens represents a word of the human speech;
the first tag represents a first normalization category of the plurality of normalization categories;
the second tag represents a second normalization category of the plurality of normalization categories;
determining a chunk size;
receiving, by the tagger, the stream of tokens;
the tagger intakes a current chunk of tokens;
receiving, by the tagger, a current chunk of tokens;
the tagger further intakes at least one prior chunk of tokens;
receiving, by the tagger, a current chunk of tokens and at least one prior chunk of tokens;
tagging the stream of tokens comprises tagging each token individually;
tagging the stream of tokens comprises inserting a start tag and a stop tag into the stream of tokens such that a pair of start and stop tags tokens therebetween;
outputting the natural language representation as a textual transcript;
displaying the natural language representation on a display device;
outputting the textual transcript on a display device;
a microphone that captures the audio input, the ASR component, the tagger, the plurality of category-specific natural language converters, and the display device are all disposed on a common mobile device;
a microphone that captures the audio input, the ASR component, the tagger, the natural language converter, and the display device are all disposed on a common mobile device;
tagging the stream of tokens is performed locally;
converting the at least one token from the first lexical language form to the first natural language form is performed locally;
tagging the stream of tokens and converting the at least one token from the first lexical language form to the first natural language form are performed locally;
the tagging and converting are performed without transmitting data to a remote node;
the tagging and converting are performed without use of a remote node;
the tagging and converting are performed without use of an internet connection;
the first tag indicates whether ITN is to be performed on the at least one token of the tagged stream of tokens;
the first language converter further determines which normalization category of a plurality of normalization categories to use for converting the first lexical language form to the first natural language form;
the first tag is one or more of a plurality of tags; and
each tag of the plurality of tags represents a different normalization category of a plurality of normalization categories.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
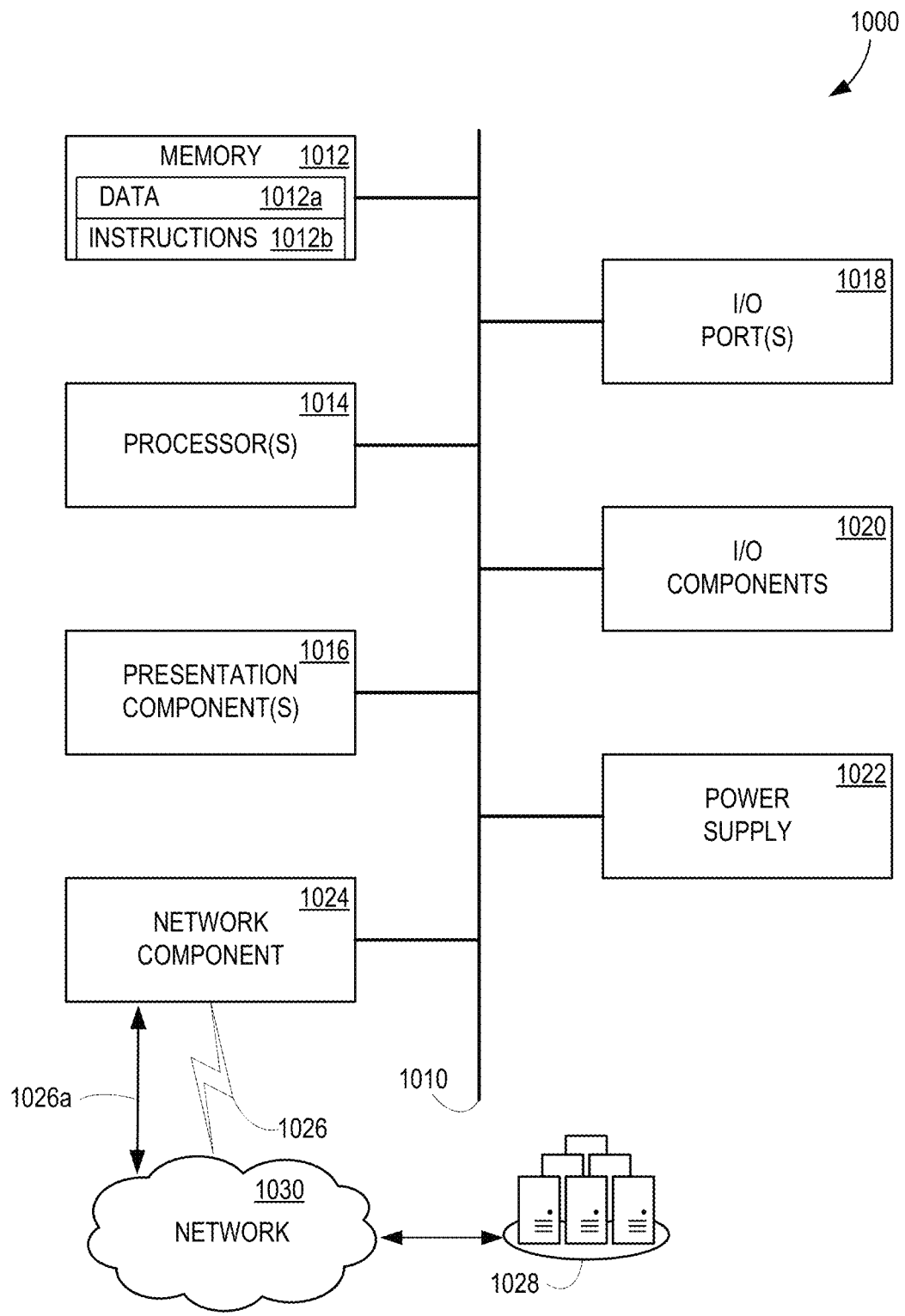
FIG. 10 is a block diagram of an example computing environment suitable for implementing some of the various examples disclosed herein.

The present disclosure is operable with a computing apparatus 1000 according to an embodiment as a functional block diagram in FIG. 10. In an example, components of a computing apparatus 1000 are implemented as a part of an electronic device according to one or more embodiments described in this specification. The computing apparatus 1000 includes a bus 1010 that directly or indirectly couples the following components: memory 1012, processor(s) 1014, presentation component(s) 1016, I/O port(s) 1018, IO components 1020, a power supply 1022, and a network component 1030. The computing apparatus 1000 comprises one or more processors 1014, which may be microprocessors, controllers, or any other suitable type of processors for processing computer executable instructions to control the operation of the electronic device. Alternatively, or in addition, the processor 1014 is any technology capable of executing logic or instructions, such as a hardcoded machine. In some examples, memory 1012 stores an operating system or any other suitable platform software provided on the computing apparatus 1000 to enable processors 1014 to be executed on the device.

Memory 1012 stores data 1012*a* and instructions 1012*b*. In some examples, computer executable instructions are provided using any computer-readable media that are accessible by the computing apparatus 1000. Computer-readable media include, for example, computer storage media such as a memory 1012 and communications media. Computer storage media, such as a memory 1012, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1012) is shown within the computing apparatus 1000, it will be appreciated by a person skilled in the art, that, in some examples, the storage is distributed or located remotely and accessed via a network or other communication link (e.g., using a communication interface 1026).

Further, in some examples, the computing apparatus 1000 comprises input/output port(s) 1018 configured to output information to one or more input/output components 1020, for example a display or a speaker, which are separate from or integral to the electronic device. Additionally, or alternatively, the input/output port(s) 1018 is configured to receive and process an input from one or more input/output components 1020, for example, a keyboard, a microphone, or a touchpad. In one example, the input/output component 1020 also acts as the input device. An example of such a device is a touch sensitive display. The input/output port(s) 1018 may also output data to devices other than the output device, e.g., a locally connected printing device. In some examples, a user provides input to the input/output components 1020 and/or receive output from the input/output components 1020. The network component 1024 of the computing apparatus 1000 may communicate over wireless communication interface 1026 and/or a wired communication interface 1026*a* to a cloud resources 1028 across network 1030.

The functionality described herein can be performed, at least in part, by one or more hardware logic components. According to an embodiment, the computing apparatus 1000 is configured by the program code when executed by the processor 1014 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein. Any range or device value given herein may be extended or altered without losing the effect sought, as will be apparent to the skilled person. While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
receive a stream of tokens, each token representing an element of human speech;
chunk the stream of tokens;
tag, by a tagger, the stream of tokens with one or more tags of a plurality of tags to produce a tagged stream of tokens by chunks in a streaming manner, each tag of the plurality of tags representing a different normalization category of a plurality of normalization categories, wherein the tagger comprises a neural network using self-attention to compute representations of input and output;
detect, by each category-specific natural language converter of a plurality of category-specific natural language converters, each of the plurality of category-specific natural language converters comprising a weighted finite state transducer (WFST), from the tagged stream of tokens, a tag representing a normalization category of the plurality of normalization categories upon which each category-specific natural language converter is trained to operate, wherein each category-specific natural language converter is trained for a single normalization category of the plurality of normalization categories by each respective trainer of a plurality of trainers;
upon detecting a first tag representing a first normalization category, convert, by a first language converter of the plurality of category-specific natural language converters, a first token of the tagged stream of tokens, from a first lexical language form to a first natural language form, wherein the first language converter is trained to operate upon the first normalization category, and wherein the first token is associated with the first tag;
upon detecting a second tag representing a second normalization category, convert, in parallel with converting by the first language converter, by a second language converter of the plurality of category-specific natural language converters, a second token of the tagged stream of tokens from a second lexical language form to a second natural language form, wherein the second language converter is trained to operate upon the second normalization category, and wherein the second token is associated with the second tag; and
based on at least the first natural language form, output a natural language representation of the stream of tokens.

2. The system of claim 1, wherein the instructions are further operative to:
determine a chunk size, wherein the stream of tokens is chunked according to the chunk size.

3. The system of claim 1, wherein the stream of tokens is obtained from a live speech, and wherein outputting the natural language representation comprises outputting the natural language representation as a streaming output.

4. The system of claim 1, wherein tagging and converting are performed locally without transmitting data to a remote node.

5. The system of claim 1, wherein the plurality of category-specific natural language converters comprises at least two natural language converters selected from a category list consisting of:
address, location, time, date, currency, decimal, fraction, email, internet address, and math.

6. The system of claim 1, wherein chunking the stream of tokens comprises dynamically determining a number of tokens per chunk.

7. A method comprising:
receiving a stream of tokens, each token representing an element of human speech;
chunking the stream of tokens;
tagging, by a tagger, the stream of tokens with one or more tags of a plurality of tags to produce a tagged stream of tokens by chunks in a streaming manner, each tag of the plurality of tags representing a different normalization category of a plurality of normalization categories, wherein the tagger comprises a neural network using self-attention to compute representations of input and output;
detecting, by each category-specific natural language converter of a plurality of category-specific natural language converters, each of the plurality of category-specific natural language converters comprising a weighted finite state transducer (WFST), from the tagged stream of tokens, a tag representing a normalization category of the plurality of normalization categories upon which each category-specific natural language converter is trained to operate, wherein each category-specific natural language converter is trained for a single normalization category of the plurality of normalization categories by each respective trainer of a plurality of trainers;
upon detecting a first tag representing a first normalization category, converting, by a first language converter of the plurality of category-specific natural language converters, a first token of the tagged stream of tokens, from a first lexical language form to a first natural language form, wherein the first language converter is trained to operate upon the first normalization category, and wherein the first token is associated with the first tag;
upon detecting a second tag representing a second normalization category, converting, in parallel with converting by the first language converter, by a second language converter of the plurality of category-specific natural language converters, a second token of the tagged stream of tokens from a second lexical language form to a second natural language form, wherein the second language converter is trained to operate upon the second normalization category, and wherein the second token is associated with the second tag; and
based on at least the first natural language form and the second natural language form, outputting a natural language representation of the stream of tokens.

8. The method of claim 7, further comprising:
determining a chunk size, wherein the stream of tokens is chunked according to the chunk size.

9. The method of claim 7, wherein the stream of tokens is obtained from a live speech, and wherein outputting the natural language representation comprises outputting the natural language representation as a streaming output.

10. The method of claim 7, wherein tagging and converting are performed locally without transmitting data to a remote node.

11. The method of claim 7, wherein the plurality of category-specific natural language converters comprises at least two natural language converters selected from a category list consisting of:
address, location, time, date, currency, decimal, fraction, email, internet address, and math.

12. The method of claim 7, wherein chunking the stream of tokens comprises dynamically determining a number of tokens per chunk.

13. One or more computer storage devices having computer-executable instructions stored thereon, which, on execution by a computer, cause the computer to perform operations comprising:
receiving a stream of tokens, each token representing an element of human speech;
chunking the stream of tokens;
tagging, by a tagger, the stream of tokens with one or more tags of a plurality of tags to produce a tagged stream of tokens by chunks in a streaming manner, each tag of the plurality of tags representing a different normalization category of a plurality of normalization categories, wherein the tagger comprises a neural network using self-attention to compute representations of input and output;
detecting, by each category-specific natural language converter of a plurality of category-specific natural language converters, each of the plurality of category-specific natural language converters comprising a weighted finite state transducer (WFST), from the tagged stream of tokens, a tag representing a normalization category of the plurality of normalization categories upon which each category-specific natural language converter is trained to operate, wherein each category-specific natural language converter is trained for a single normalization category of the plurality of normalization categories by each respective trainer of a plurality of trainers;
upon detecting a first tag representing a first normalization category, converting, by a first language converter of the plurality of category-specific natural language converters, a first token of the tagged stream of tokens, from a first lexical language form to a first natural language form, wherein the first language converter is trained to operate upon the first normalization category, and wherein the first token is associated with the first tag;
upon detecting a second tag representing a second normalization category, convert, in parallel with converting by the first language converter, by a second language converter of the plurality of category-specific natural language converters, a second token of the tagged stream of tokens from a second lexical language form to a second natural language form, wherein the second language converter is trained to operate upon the second normalization category, and wherein the second token is associated with the second tag; and
based on at least the first natural language form and the second natural language form, outputting a natural language representation of the stream of tokens.

14. The one or more computer storage devices of claim 13, wherein the operations further comprise:
determining a chunk size, wherein the stream of tokens is chunked according to the chunk size.

15. The one or more computer storage devices of claim 13, wherein the stream of tokens is obtained from a live speech, and wherein outputting the natural language representation comprises outputting the natural language representation as a streaming output.

16. The one or more computer storage devices of claim 13, wherein tagging and converting are performed locally without transmitting data to a remote node.

17. The one or more computer storage devices of claim 13, wherein the plurality of category-specific natural language converters comprises at least two natural language converters selected from a category list consisting of:
address, location, time, date, currency, decimal, fraction, email, internet address, and math.

18. The one or more computer storage devices of claim 13, wherein chunking the stream of tokens comprises dynamically determining a number of tokens per chunk.

* * * * *